(12) United States Patent
Lam

(10) Patent No.: US 6,390,699 B1
(45) Date of Patent: May 21, 2002

(54) KEYBOARD WITH MOVEABLE BASE PLATE PROVIDING KEY TRAVEL

(75) Inventor: Hau Chung Lam, Kowloon (HK)

(73) Assignee: Associate Technology Limited, Hong Kong (HK)

( * ) Notice: Subject to any disclaimer, the term of this patent is extended or adjusted under 35 U.S.C. 154(b) by 0 days.

(21) Appl. No.: 09/449,948

(22) Filed: Nov. 29, 1999

(51) Int. Cl.⁷ .................................................. B41J 5/26
(52) U.S. Cl. ...................................... 400/472; 400/491
(58) Field of Search ................................ 400/472, 489, 400/491, 491.1, 491.2, 680–682, 481; 341/21, 22; 361/680; 345/169, 168

(56) References Cited

U.S. PATENT DOCUMENTS

| | | | |
|---|---|---|---|
| 3,940,758 A | | 2/1976 | Margolin ..................... 340/337 |
| 5,422,447 A | | 6/1995 | Spence ........................ 200/5 A |
| 5,424,516 A | | 6/1995 | Emmons ...................... 200/344 |
| 5,439,304 A | * | 8/1995 | Phillips et al. ............... 400/492 |
| 5,471,022 A | * | 11/1995 | Kiss et al. ..................... 200/83 |
| 5,519,569 A | | 5/1996 | Sellers ......................... 361/680 |
| 5,595,449 A | * | 1/1997 | Vitkin ......................... 400/472 |
| 5,616,897 A | * | 4/1997 | Weber et al. ................. 200/5 A |
| 5,879,088 A | * | 3/1999 | English ........................ 400/481 |

FOREIGN PATENT DOCUMENTS

| | | |
|---|---|---|
| EP | 830102067 | 3/1983 |
| EP | 0 088 365 A1 | 9/1983 |
| EP | 920102761 | 2/1992 |
| EP | 0 556 426 A1 | 8/1993 |
| WO | WO 95/26563 | 10/1995 |

* cited by examiner

*Primary Examiner*—John S. Hilten
*Assistant Examiner*—Anthony H. Nguyen
(74) *Attorney, Agent, or Firm*—Renner, Kenner, Greive, Bobak, Taylor & Weber

(57) ABSTRACT

A keyboard, which may be made very thin and be suitable for notebook computers or personal digital assistants, has a substantially rigid base plate supported for movement between an extended position and a retracted position but biased to the extended position. The keyboard has a plurality of keys and a switch means associated with each key to register when the key has been pressed. When a key is pressed the base plate moves from the extended position to the retracted position, that movement providing for at least some travel of the pressed key. A sufficient degree of travel can be provided that the keyboard, even in a very thin form, can be used for touch-typing.

21 Claims, 7 Drawing Sheets

KEYBOARD WITH MOVEABLE BASE PLATE PROVIDING KEY TRAVEL

TECHNICAL FIELD

This invention particularly relates to the design of keyboards that are very thin but which provide sufficient key travel for touch-typing purposes. The keyboards are particularly suitable for use in or with compact portable apparatuses such as notebook computers and personal digital assistants. However, the characteristic features of the invention can be incorporated in thicker keyboards and the keyboards, whether thicker or thinner keyboards, can be used with non-portable apparatuses.

BACKGROUND ART

Compact portable apparatuses such as notebook computers and personal digital assistants have become and will continue to become smaller and lighter because of the advancement of computer technology. However, the keyboard has remained something of a problem while the electronic parts reduce in size and weight. To allow for comfortable typing, and touch-typing in particular, the width and depth of a keyboard cannot be made too small because too close a spacing between small sized keys prevents comfortable and efficient typing, and particularly touch-typing. A foldable keyboard is one way of providing a keyboard which is large enough to allow touch-typing while enabling the width of the keyboard to be reduced when it is folded, for example, for the purpose of storing the keyboard in a compact apparatus. However, the only way left to reduce the overall volume of a keyboard, whether of the folding type or not, is to reduce the thickness of the keyboard, and in particular, to reduce the thickness of the keys of the keyboard.

Touch-typists like the keys of a keyboard to have a good feel when they are pressed. They should move downwardly in a stable manner when pressed and offer resistance to the fingers while doing so. The difficulties in constructing a very thin key while maintaining good feel can be explained by reference to FIG. 1. This figure shows a cross section illustrating the structure of a typical prior art key used in a thin keyboard. The key 10 comprises a key cap 11 and a silicon rubber support 12 to which the key cap is mounted and which spaces the key cap above a printed circuit board 13. When a finger presses the key at point A, the resilient flexibility of the rubber support 12 allows its deformation whereby the key cap 11 is lowered vertically and evenly to enable a projection 14 of the support 12 to make contact with the printed circuit board 13. The projection 14 functions as a switch means enabling the pressing of the key to be registered when it contacts the printed circuit board. However, if the key 10 is pressed off-center at point B, the key cap 11 may tilt. In this case, there will not be a good feel about the movement of the key and, furthermore, a proper contact between the projection 14 and the printed circuit board 13 might not be made.

Lever mechanisms are often used to make sure that the whole key cap can travel evenly and vertically when pressed. Such mechanisms are normally placed beneath the key cap and above a support plate, such as a printed circuit board. Each key has its own individual lever mechanism supporting it. In a typical key structure such as that shown in FIG. 1, it can be seen that the keyboard cannot be made very thin because there is firstly a need to have a silicon rubber support 12 or other spring-like mechanism beneath the key cap 11 and there is secondly a need to have a lever mechanism placed beneath the key cap for stabilization purposes. For the key to have reasonably good feel for touch-typing, the key travel needs to be at least 2–4 mm. Even with a key travel of 2 mm, the thinnest keyboard constructed with the type of key shown in FIG. 1 is not likely to have a thickness of less than about 5.5 mm.

U.S. Pat. No. 5,424,516 (Emmons) and U.S. Pat. No. 5,519,569 (Sellers) show ways of constructing lever mechanisms to reduce the overall thickness of the keys, and hence of the keyboard. However, the presence of the lever mechanisms placed beneath the key caps still places a limit on the degree to which the thickness of the keys, and hence the keyboards, can be reduced.

In other keyboards, lever mechanisms are not used and other approaches are taken to try and obtain uniform vertical movement of the keys when pressed. Examples are given in European Patent Publications 88,365 and 556,426 and in U.S. Pat. No. 5,422,477 (Spence).

As to the overall width of the keyboard, U.S. Pat. No. 3,940,758 (Margolin) shows a folding keyboard. However, as already indicated, while a folding keyboard allows the width of a keyboard to be reduce for storage, the thickness of the folded keyboard is increased. In other words, the volume occupied by the keyboard is not reduced.

There is therefore a need to provide a keyboard having a small volume, that is, a thin keyboard, which keyboard has key caps which travel evenly and substantially vertically when pressed and which, preferably allow for a good touch-typing feel.

DISCLOSURE OF THE INVENTION

An object of the invention is to provide a thin keyboard having keys with key caps having a good degree of travel and stability. A preferred object is that these features, together with the spacing of the keys, is such as to allow for touch-typing. Another object of the invention is to provide a thin keyboard, which is particularly suitable for use with portable apparatuses, and which can be manufactured at relatively low cost. However, as has already been indicated, the essential characteristics of the present invention can be incorporated in thicker keyboards if that should be desired.

The present invention broadly consists of a keyboard including a substantially rigid base plate; supporting means for supporting the base plate so as to be movable between an extended position and a retracted position; biasing means biasing the base plate to the extended position; a plurality of keys arrayed over an outer surface of the base plate; and a switch means associated with each key; wherein, when any key is pressed sufficiently firmly, the supported base plate moves against the action of the biasing means substantially from the extended position to the retracted position thereby providing for at least some travel of the pressed key, and the switch means associated with the pressed key enables the registration of the pressed key, and wherein release of the pressed key allows the base plate to return to the extended position under the action of the biasing means.

From this, it will be realised that according to the present invention, the travel of the pressed key is provided, at least in part, by the movement of the base plate.

In a preferred embodiment of the invention, each key includes a key cap biased to a raised position spaced from the base plate and movable to a depressed position against the base plate when an outer face of the key cap is pressed sufficiently firmly. The pressing of any key sufficiently firmly to move the base plate from its extended position to its retracted position is also sufficient to move the key cap of that key from its raised position to its depressed position. In this embodiment, the full travel of the key cap is provided by two movements. There is firstly the small degree of movement of the key cap from its raised position to its depressed position against the base plate and then there is the movement of the base plate from its extended position to its retracted position. It is the movement of the base plate which preferably provides most of the overall movement of the key cap. The main purpose of the initial movement of the key cap from its raised position to its depressed position is to actuate the switch means associated with the pressed key enabling its registration.

The switch means associated with each key preferably includes an electrical circuit closing means on an inner face of the key cap and separated electrical contacts on the base plate corresponding to that key. The electrical circuit closing means makes contact with and closes the corresponding electrical contacts on the base plate when the key cap is pressed to its depressed position. The base plate preferably includes a printed circuit board.

In the preferred embodiment of the invention, the outer surface of the base plate is covered by a sheet of material having the plurality of keys on the sheet, and preferably integrally formed in the sheet. The preferred sheet is a sheet of resilient material and the resilience of the material biases each key cap to its raised position while allowing the key cap to be moved to its depressed position.

In one embodiment of the invention, the sheet is not attached to the base plate and in such an embodiment, the supporting means preferably includes a frame extending substantially about the base plate with the sheet being attached to that frame. However, in another embodiment, the sheet is attached to the base plate.

In one embodiment, the supporting means includes a plurality of feet attached to the base plate at a side opposite that surface having the plurality of keys. Placement of the feet on a supporting surface supports the base plate clear of the supporting surface. The biasing means includes the feet being resiliently compressible, for example, by being made from a resiliently compressible material, so that when a key is pressed sufficiently firmly the feet compress and the base plate thereby moves from its extended position to its retracted position. The feet may be formed simply of a piece of resilient material or, alternatively, the feet may be formed of a suitably shaped, resilient material which when depressed will create a definite click feel. The supporting means may also includes a frame with which the plurality of feet engage. However, it is not necessary for there to be a frame. Where there is no frame, the feet may be placed directly on a supporting surface such as a desk top. In this case, the keyboard would normally be separate from the apparatus with which it is being used, except for electrical or other connections between the keyboard and the apparatus. Such an apparatus may be a notebook computer or a personal digital assistant, for example. Where the supporting means includes a frame, the keyboard may either be separate from, or incorporated in as part of, the apparatus with which the keyboard is being used.

In another embodiment where the supporting means includes a frame, the supporting means also includes an arm attached to each of top and bottom edges of the base plate. The arms extend in parallel beyond a side edge of the base plate and are pivotally attached at their distal ends to the frame. This allows the base plate to undergo some pivotal movement relative to the frame between the extended and retracted positions of the base plate. In this embodiment the biasing means may includes at least one spring-loaded microswitch between the frame and the base plate at an opposite end of the base plate. The use of a microswitch is to provide a positive click when a key is pressed to improve the tactile response of the key for the user of the keyboard. Spring-loaded microswitches may be used as the biasing means in other embodiments of the inventions as well. Alternatively, a suitably shaped resiliently compressible material can also provide a click feeling, as described above.

The keyboard can have two, or even more, base plates arranged side-by-side. Each base plate is movable between its extended position and its retracted position independently of the other. The multiple base plates may be interconnected by one or more flexible printed circuit boards or other types of electrical or other connections.

In one embodiment where there are at least two base plates, these base plates are pivotally connected relative to each other so that one base plate can be folded against the other. In this way the width of the keyboard can be reduced for storage or carrying of the keyboard.

In another embodiment of the invention, the supporting means includes a pair of interconnected lever arms pivotally connected to the base plate at an edge of the base plate and another pair of interconnected lever arms pivotally connected to the base plate at an opposite edge of the base plate. At least one arm of one pair of arms is connected to an arm of the other pair of arms so that the lever arms pivot together and as they do the base plate moves uniformly between its extended and retracted positions. The lever arms of each pair of lever arms are preferably interconnected by an axle portion and it is the axle portion which is pivotally connected to the respective edge of the base plate. All of the lever arms preferably lie clear of the base plate for all pivotal positions of the arms between the extended and retracted positions of the base plate, and in the retracted position of the base plate the arms lie in the plane of the base plate. The purpose of this is to achieve as thin a keyboard as possible. In this embodiment, the supporting means may also include a frame with which the distal ends of the arms are pivotally engaged. The biasing means is preferably a spring which acts on at least one of the lever arms to bias all of them to positions where the base plate is in its extended position.

BRIEF DESCRIPTION OF THE DRAWINGS

Some preferred embodiments of the invention will be described with reference to the accompanying drawings in which.

PREFERRED EMBODIMENT FOR CARRYING OUT THE INVENTION

First embodiments of the present invention are shown in FIGS. 2A to 2F, 3A and 3B of the drawings. These figures show only the left-hand portion 1 of a computer keyboard. This portion would usually be used in conjunction with a right-hand portion of similar construction.

Figure 2A:
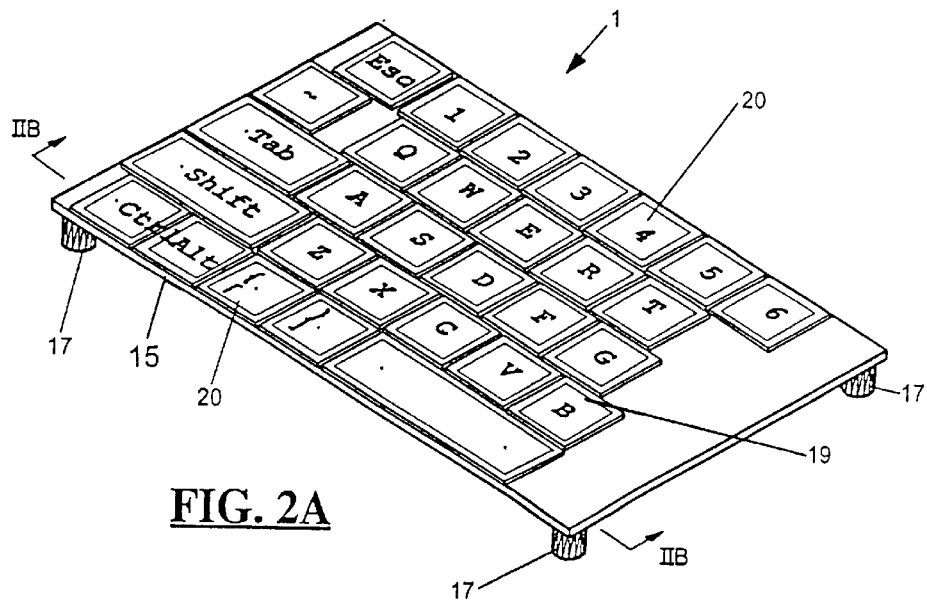
FIG. 2A shows a perspective view of a left-hand portion of one embodiment of computer keyboard according to the present invention in which a sheet is attached to a base plate.
Figure 2B:
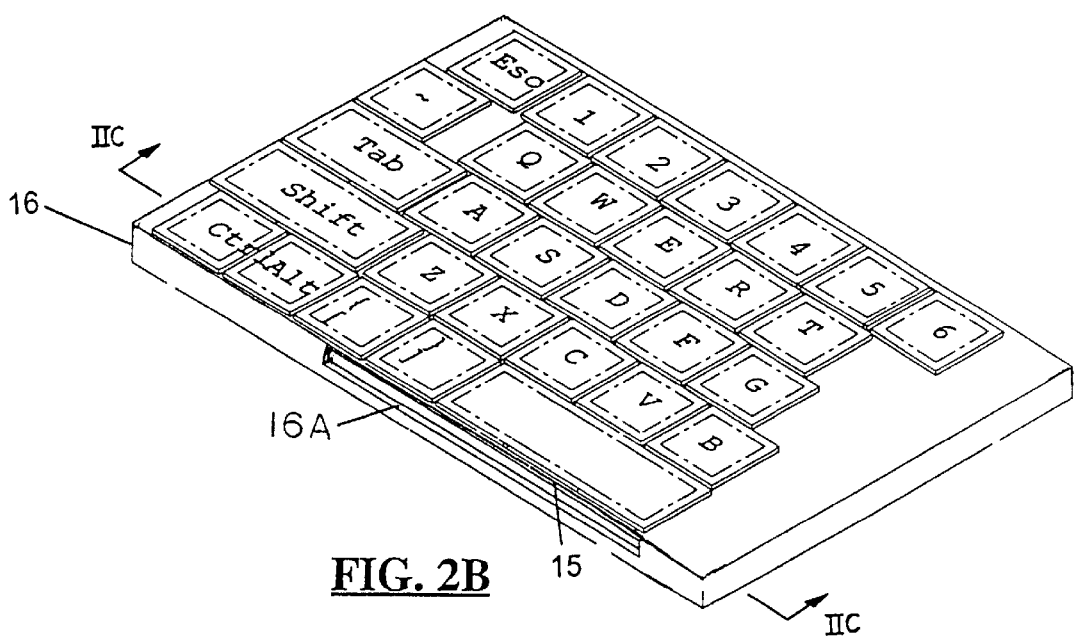
FIG. 2B shows a perspective view of a left-hand portion of a second embodiment of a keyboard according to the present invention, in which a sheet is attached to a frame instead of the a base plate.

The keyboard 1 comprises a substantially rigid base plate 15. The base plate is movable between an extended position shown in FIGS. 2C and 2E and a retracted position shown in FIGS. 2D and 2F. Supporting means may be provided, for supporting the base plate 15 and this is shown in FIG. 2B as a rectangular frame 16 extending about the peripheral edges of the base plate. The frame portions of the two halves of the keyboard may be separate, or connected or connectable for greater stability. The frame may be cut away at the front, see cut out 16A in FIG. 2B, to allow for a more comfortable positioning of a user hands. In particular, it would be desirable to provide a cut out in the region where the thumbs sit in preparation for hitting or whilst hitting the space bar.

Figure 2C:
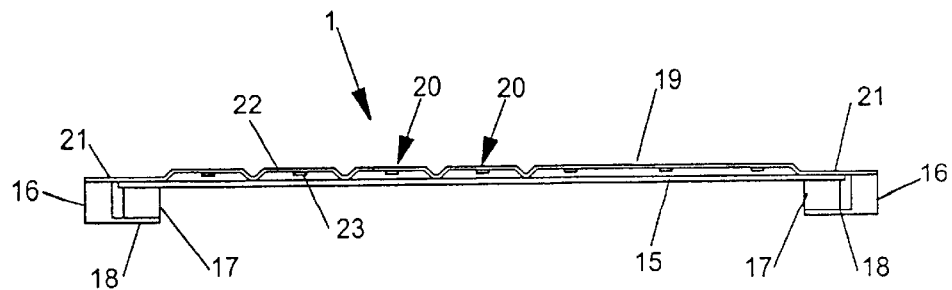
FIG. 2C shows a cross-section through IIC—IIC of FIG. 2B with the base plate in its extended position.
Figure 2D:
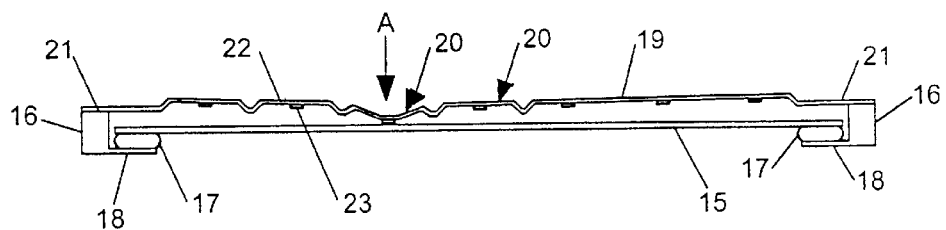
FIG. 2D corresponds with FIG. 2C but shows a key having been pressed and the base plate in its retracted position.

Biasing means bias the base plate 15 to its extended position. The biasing means may comprise four resilient sponge pads 17 as shown in FIGS. 2A, 2C and 2D, there being one at each corner on the underside of the base plate 15. These pads may be located simply beneath the base plate or between the underside of the base plate 15 and a flange 18 of a frame 16 (see FIGS. 3A and 3B, for example). When no downwards force is applied to the base plate 15 the resilience of the pads keeps them extended and therefore maintains the base plate in its extended position as shown in FIG. 2C. However, when a sufficient force presses downwardly on the top of the base plate as shown in FIG. 2D, the base plate is forced down to its retracted position thereby compressing the pads 17. This movement of the base plate from its extended position to its retracted position provides at least part of the travel of any key associated with the base plate that is pressed by a user.

Figure 1:
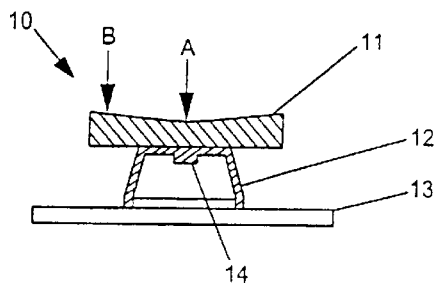
FIG. 1 shows a cross-section through a key mounted to a printed circuit board according to a prior art embodiment of a thin keyboard.
Figure 2E:
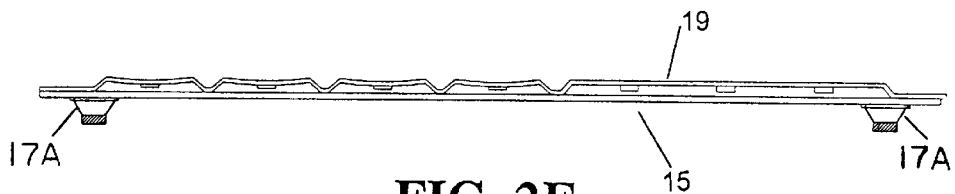
FIG. 2E shows a cross-section through IIB IIB of FIG. 2A with the base plate in its extended position.
Figure 2F:
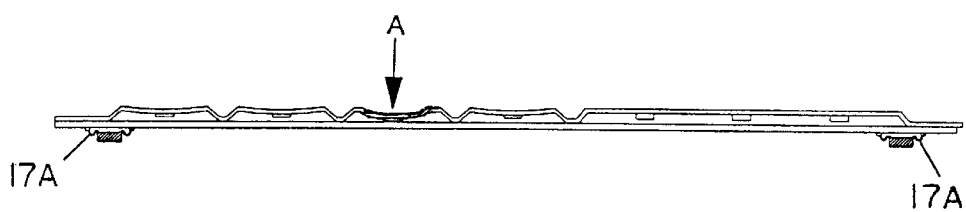
FIG. 2F is similar to FIG. 2E, but shows the base plate in its retracted position.

Alternatively, as shown in FIGS. 2E and 2F, the biasing means may comprise a resiliently compressible material in a hollow cone, pyramid or truncated pyramid shape which may be upright such as in the support 12 shown in FIG. 1, and discussed earlier or inverted, such as the feet 17A shown in FIGS. 2E and 2F. Both these configurations would simulate the click feel experienced by typists in respect of a conventional keyboard.

The base plate 15 is covered by a very thin sheet 19 having a plurality of keys 20 integrally formed in it. The profile of these keys is preferably as low as possible. For example, the sheet 19 may be a rubber (preferably a silicon rubber) sheet and a rubber key can have a thickness less than about 2 mm. Alternatively, the sheet can be a membrane, for example, made from Mylar (trade mark) membrane and a membrane type key can have a thickness of less than about 1 mm. With such thin keys, there can be very limited key travel by themselves and so, by themselves, they are not particularly suitable for touch-typing. The additional movement which makes them more suitable for touch-typing is provided by the movement of the base plate 15.

The base plate 15 usually includes a printed circuit board or a printed circuit layer mounted on a substantially rigid board. The sheet 19 is placed over the board. The sheet may be attached to the board, as shown in FIGS. 2A, 2E, 2F, 3A and 3B, in the embodiment of the invention shown in FIGS. 2B, 2C and 2D, the sheet may be attached instead at its periphery 21 to a frame 16 which supports the board. Each key 20 has a key cap 22 which is normally spaced slightly from the board 15. The board 15 has electrical contacts (not shown) beneath each key cap and on the underside of each key cap there is a switch means in the form of a projecting conducting strip or point 23 which, when the key cap is pressed downwardly, closes the electrical contacts on the board 15 associated with that key to enable the registration of the pressed key. This can be seen in FIGS. 2D and 2F. At point A, a key 20 has been pressed. The switch means 23 associated with that key has made contact with the printed circuit board 15. At the same time the whole printed circuit board has been pushed down from its extended position to its retracted position, thereby compressing the feet 17 or 17A. If a key 20 towards one edge of the keyboard is pressed, it is unlikely that all four feet will be compressed equally. In that case the printed circuit board 15 will tilt to a small degree but because the degree of tilt is very small the travel of the key being pressed is still substantially vertical and balanced. The feet 17, 17A can be replaced with other biasing means.

Figure 3A:
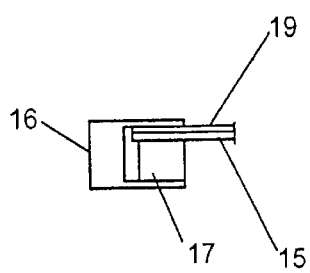
FIGS. 3A and 3B are similar to the left hand ends of FIGS. 2C and 2D respectively but show a modification of that embodiment of the invention in that the keyboard shown combines the features of the keyboards shown in FIGS. 2C, 2D, 2E and 2F.
Figure 3B:
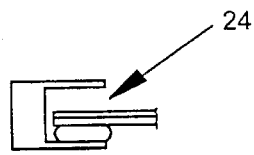

FIGS. 3A and 3B provide detail of the invention where the sheet 19 is actually attached to the upper surface of the printed circuit board or other base plate 15 as in FIGS. 2A, 2E and 2F. FIGS. 3A and 3B show the addition of an optional frame 16 FIG. 3A shows the base plate in its extended position whereas FIG. 3B shows it in its retracted position.

The embodiments of the keyboard so far described have several advantages. Firstly, the main part of the keyboard 1 may be made very thin. With the base plate 15 in its extended position, an empty space is provided beneath the base plate; see FIGS. 2C and 2E. When the keyboard is not being used, for example, during transportation of the apparatus with which it is used or in which it is incorporated, that empty space may accommodate some part of the hardware of the computer or other apparatus. When the apparatus is opened for the keyboard to be used, that hardware can be moved out by some mechanism or removed manually. Alternatively the keyboard may be lifted off the apparatus and separately placed on the desk top or other surface on which the apparatus and its keyboard are being used. A second advantage of the keyboard is that its construction is very simple. There are very few parts involved, which allows a relatively low cost keyboard to be manufactured. A third advantage is that even though the keyboard, or at least the main part not including the frame 16, may be very thin, there is sufficient movement and stability to the movement of the keys when pressed to enable touch-typing in a manner similar to that which can be done with a standard keyboard consisting of individual and complicated key switches. The possibility of a click feel associated with the use of some of the biasing means described also represents another advantage of these first embodiments of the invention.

Figure 4A:
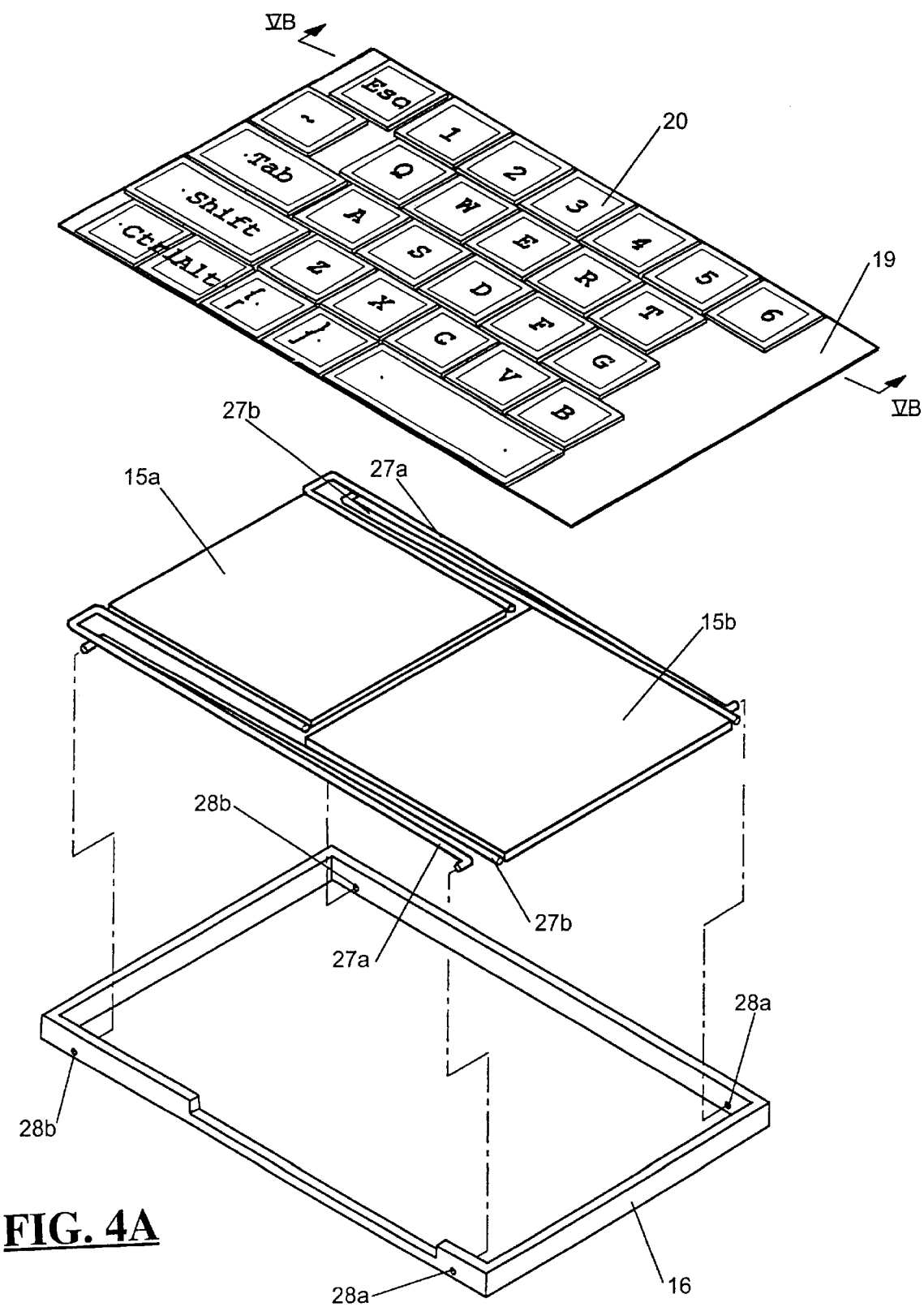
FIG. 4A shows an exploded perspective view of another embodiment of the invention having two base plate portions.
Figure 4B:
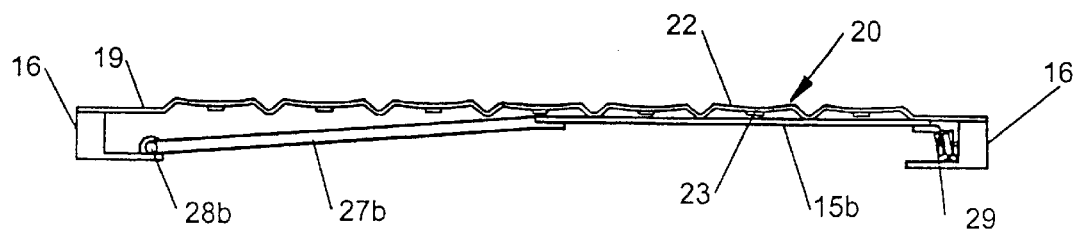
FIG. 4B shows a cross-section through VB—VB of the assembled keyboard of FIG. 4A, but with the left hand portion of the base plate and its associated arms omitted for improved clarity, the right hand base plate being shown in its extended position.
Figure 4C:
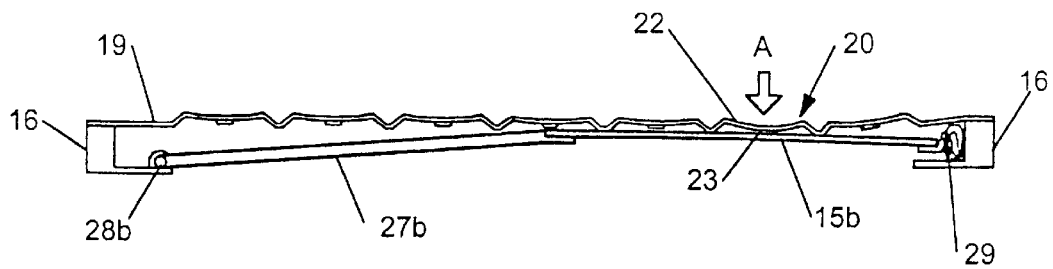
FIG. 4C corresponds with FIG. 4B but shows a key having been pressed and the right hand base plate moved to its retracted position.

Another embodiment of the invention is shown in FIGS. 4A, 4B and 4C. In FIG. 4A, the base plate 15 again includes s a printed circuit board but that printed circuit board consists of two parts 15*a* and 15*b*. Each of the boards 15*a* and 15*b* has an arm, 27*a* and 27*b* respectively, attached to each of top and bottom edges of the board. The two arms of each board extend in parallel beyond a side edge of the board and are pivotally attached at 28*a* and 28*b* to the frame 16. In FIG. 4A it can be seen that the arms 27*a* of the board 15*a* are turned back on themselves to provide a space through which the arms 27*b* of the other board 15*b* pass. This arrangement allows each of the boards 15*a* and 15*b* to be moved independently from its extended position to its retracted position without interference between the arms of each of the boards. The sheet 19 having the keys 20 is placed over the boards 15*a* and 15*b* and is attached to the frame 16.

In the cross-sectional views of FIGS. 4B and 4C, only the right side printed circuit board 15*b* is shown to illustrate the working of this embodiment of the invention. The left hand board 15*a* has been omitted for improved clarity. Referring to FIG. 4C, when the key 20 at point A is pressed, the key pad 22 first moves slightly to close the switch means 23 as has been previously described and then the board 15*b* moves from its extended position shown in FIG. 4B to its retracted position shown in FIG. 4C. Because the board 15*b* is in fact pivotally mounted at 28*b* by way of its arms 27*b*, the movement of the board is a slightly arcuate movement but because of the distance of the board from the pivotal attachment 28*b* the movement is, for practical purposes, essentially vertical and uniform.

It can be seen in FIG. 4B that the arms 27*b* are angled slightly relative to the board 15*b* so that in the extended position of the board it is not tilted but is horizontal. The distal edge of the board 15*b*, that is the edge opposite that from which the arms 27*b* extend, is supported by a spring-loaded microswitch 29 which is also attached to the frame 16. The microswitch provides the biasing means biasing the board 15*b* to its extended position but also adds a click feel, better simulating a conventional computer keyboard for the benefit of the touch-typist. One of the advantages of this embodiment of the invention is that the pressing of a key has a more uniform feel no matter where the key is positioned on the sheet 19. For the simpler construction of FIGS. 2A to 2F greater force is required when pressing key in the middle part of the keyboard compared with pressing a key near one corner. That differential is reduced in the present embodiment of the invention. The click feel represents another advantage of this embodiment of the invention.

The embodiments of the invention shown in the remaining figures of the drawings are characterized by the supporting means having a pair of interconnected lever arms pivotally connected to the base plate 15 at an edge of the base plate and another pair of interconnected lever arms pivotally connected to the base plate at an opposite edge of the base plate with at least one arm of one pair of arms being connected to an arm of the other pair of arms so that the lever arms pivot together. As they do the base plate moves uniformly between its extended and retracted positions. The drawings show several embodiments of this type. They all allow the construction of an even thinner keyboard than the embodiments so far described.

Figure 5A:
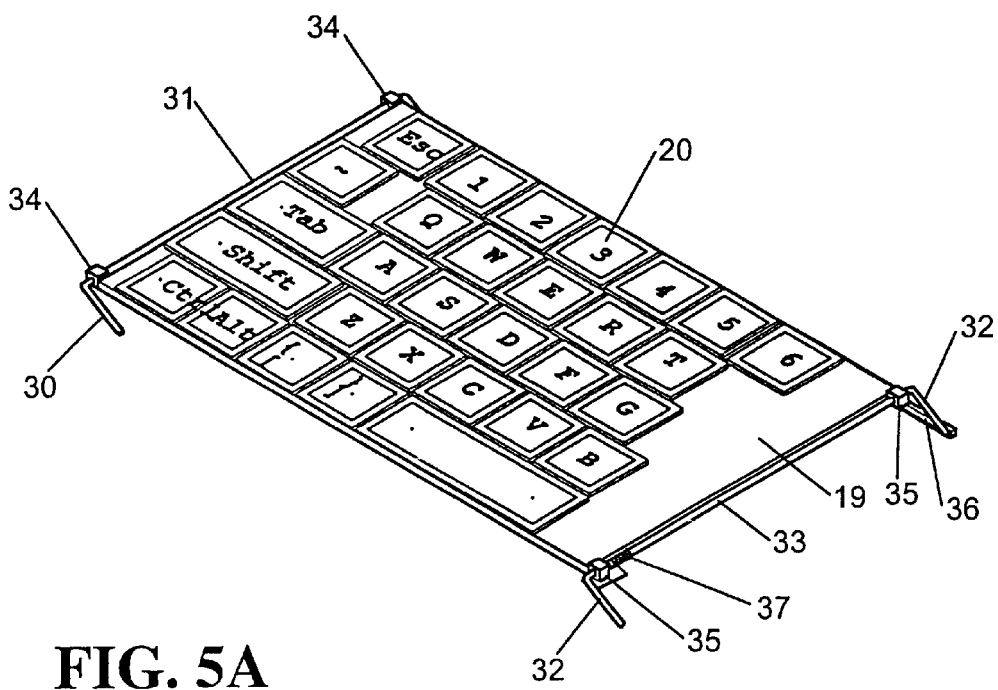
FIG. 5A shows a perspective view of another embodiment of the left hand end of a computer keyboard with the base plate in the extended position.
Figure 5B:
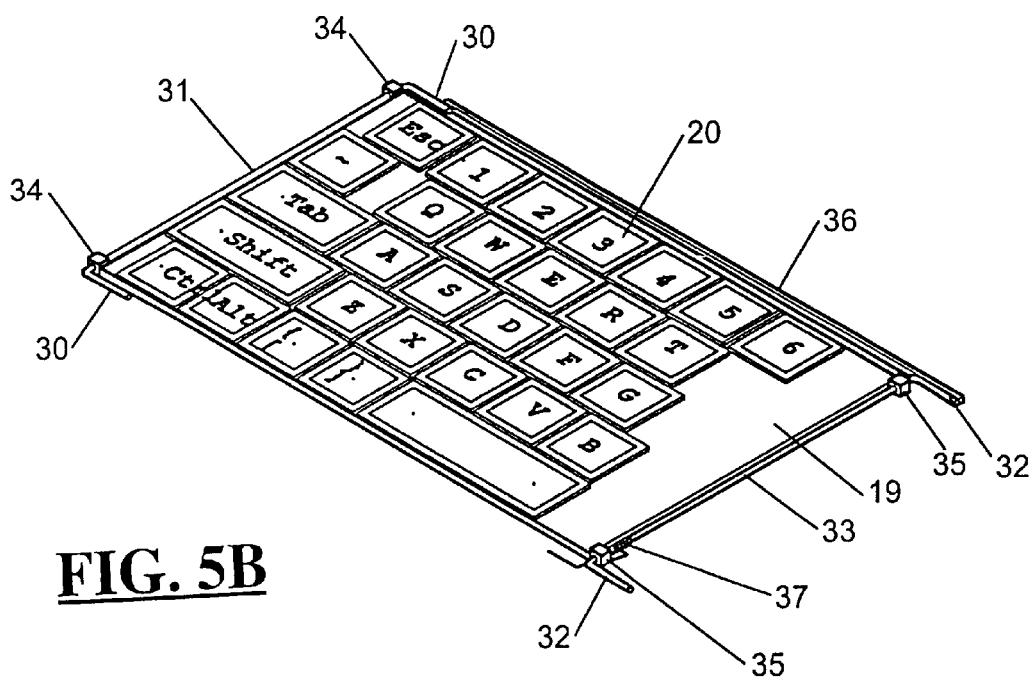
FIG. 5B corresponds with FIG. 5A except that the base plate is in the retracted position.

Referring to FIGS. 5A and 5B, the base plate (not shown) is covered by the sheet 19 which is directly attached to the base plate. As before, the sheet can be a silicon rubber sheet or Mylar membrane and has the keys 20 integrally formed in it. The usual base plate will again be a printed circuit board.

In FIGS. 5A and 5B, the supporting means include a first pair of lever arms 30 interconnected by an axle portion 31 at one end of the keyboard and a second pair of lever arms 32 interconnected by an axle portion 33 at the other end of the keyboard. The axle portions 31 and 33 are mounted in bearings 34 and 35 at the respective ends of the keyboard. The lever arms 30 and 32 are therefore pivotable with respect to the keyboard. At the top edge of the keyboard, a distal end of a lever arm 30 is connected by a link 36 to a distal end of a lever arm 32. That ensures that the lever arms 30 and 32, which are parallel to each other, always pivot together in the same direction. A spring 37 is placed about the axle portion 33 and interacts with the base plate to provide the biasing means biasing the base plate to its extended position shown in FIG. 5A. When a key is pressed, the whole base plate moves downwardly evenly and substantially vertically, thus providing a degree of travel as required for a good feel of the keyboard for touch-typing. It can be seen in FIG. 5B that the lever arms 30 and 32 together with their axle portions 31 and 33, as well as the link 36, all lie clear of the base plate for all pivotal positions of the arms between the extended and retracted positions of the base plate, and, in the retracted position of the base plate shown in FIG. 5B, these components lie in the plane of the base. In other words, they themselves make little or no contribution to the thickness of the keyboard over the thickness of the base plate. That is why this type of keyboard can be made very thin.

The lever arms can be made from wire or a rod or tube of a suitable substance, such as metal, the diameter of which will depend on the strength of the rod, tube or wire used.

It will be appreciated that in moving from the extended position to the retracted position, the base plate will in fact move through a slightly arcuate path. However, as shown in FIG. 5A, even in the extended position of the base plate, the lever arms 30 and 32 are not far off horizontal. They have only such an angular disposition as required to provide the base plate with maybe 2 mm of travel. Therefore, the movement of the base plate from its extended position to its retracted position is essentially a vertical movement. If the keyboard of FIGS. 5A and 5B is mounted in a frame, then the engagement of the distal ends of the lever arms 30 and 32 with the frame can provide for a small degree of translational movement of those ends as the base plate moves between its extended and its retracted positions.

Figure 6:
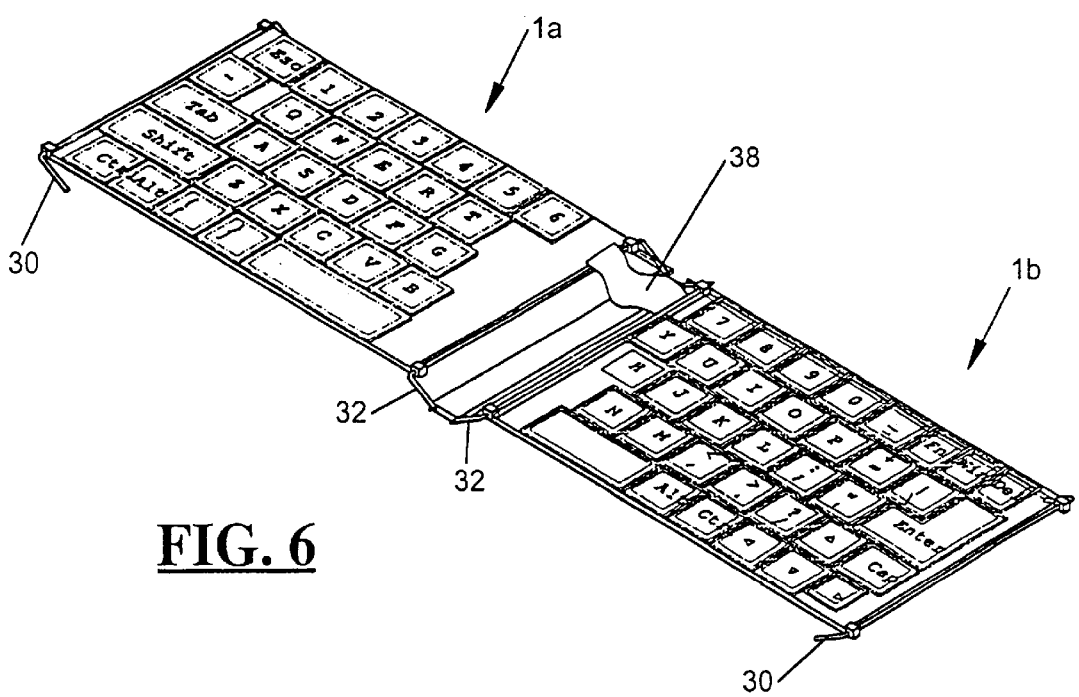
FIG. 6 shows a perspective view of a full computer keyboard showing how a left hand computer keyboard according to FIGS. 5A and 5B can be pivotally connected to a corresponding right hand computer keyboard to make a folding keyboard.

FIG. 6 shows a complete keyboard with left hand and right hand portions of keyboard 1a and 1b pivotally connected together at the center of the keyboard. This keyboard can be folded up along the center for storage or for carrying. When the keyboard is folded, the lever arms 32 will contact each other allowing the whole keyboard to be folded into a thin package. Where the two keyboard portions each have the base plate comprising a printed circuit board, these may be joined by a flexible printed circuit board 38 connecting them.

Figure 7A:
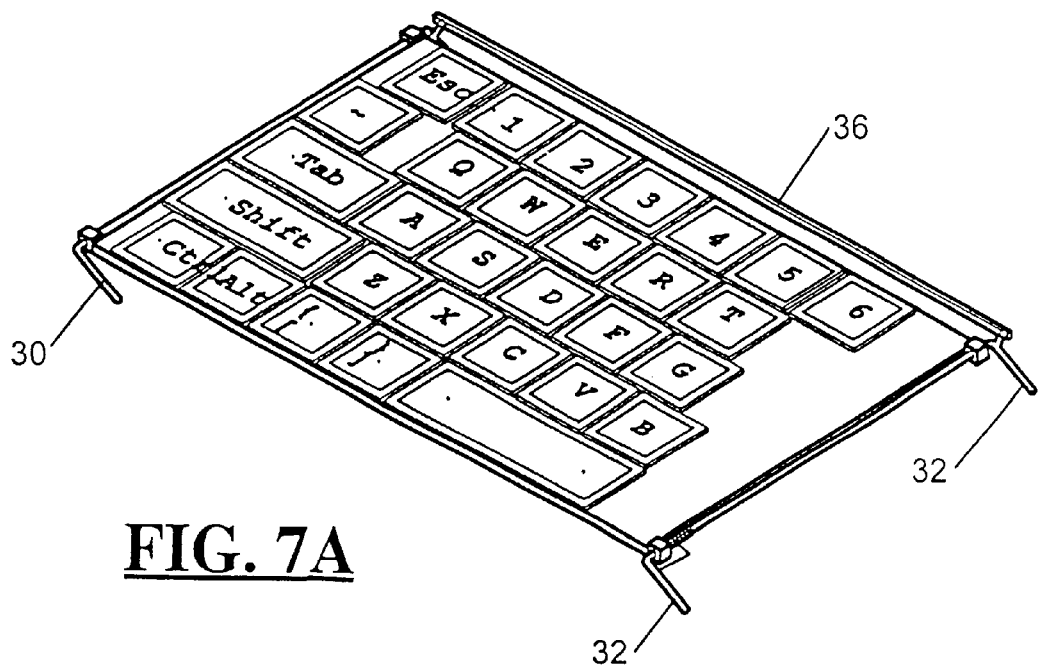
FIG. 7A shows a perspective view of a left hand end portion of a computer keyboard according to another embodiment of the invention, the base plate being in the extended position.
Figure 7B:
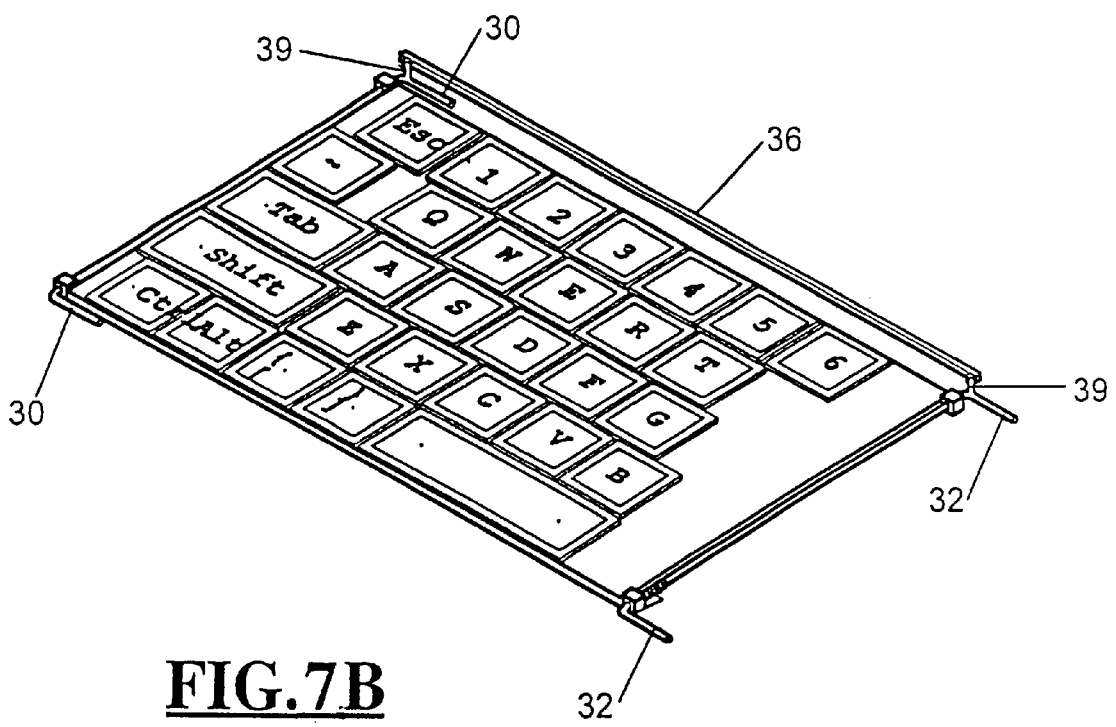
FIG. 7B corresponds with FIG. 7A except that the base plate is in its retracted position.

The embodiment of FIGS. 7A and 7B is very similar to that of FIGS. 5A and 5B. However, in FIGS. 5A and 5B, the link 36 is pivotally connected at the distal ends of the lever arms 30 and 32 whereas in FIGS. 7A and 7B, the link 36 is pivotally connected to a secondary lever arm 39 projecting from each of the lever arms 30 and 32 towards its proximal end. Again, this linkage ensures that all lever arms pivot in the same direction together so that the base plate can move substantially vertically in a uniform manner. This particular arrangement has the advantage that even when the base plate is in its retracted position as shown in FIG. 7B, the link 36 is as effective in transmitting forces between the lever arms 30 and 32 as when the base plate is in its extended position shown in FIG. 7A, whereas that is not the case for the embodiment of FIGS. 5A and 5B.

Figure 8A:
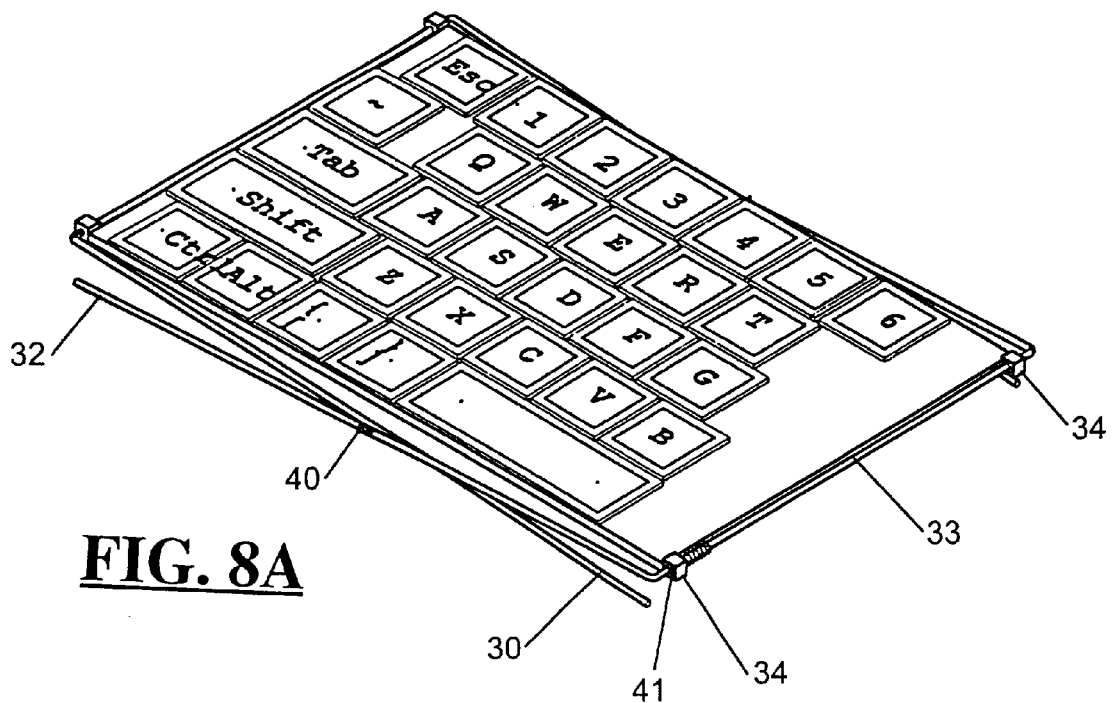
FIG. 8A shows a perspective view of the left hand end portion of another embodiment of computer keyboard according to the present invention, the base plate being in the extended position.
Figure 8B:
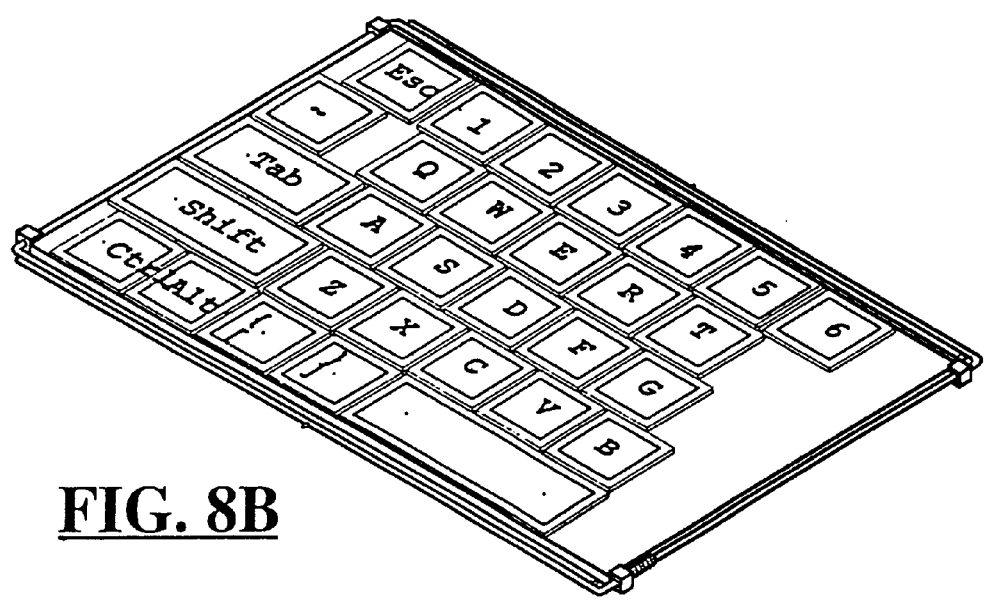
FIG. 8B corresponds with the FIG. 8A except that the base plate is in its retracted position.

In FIGS. 8A and 8B, the supporting means lever arms take the form of a scissor-type mechanism. In particular, the lever arms 30 crossed the lever arms 32. Where the arms cross they are pivotally connected at 40. In this embodiment of the invention, the holes 41 in the bearings 34 through which the axle portion 33 pass are elongated to allow some translational movement of that axle portion towards and away from the associated edge of the keyboard. This is necessary to allow the scissor-action to work and thereby allow the base plate to be moved between its extended and retracted positions. If desired, the holes through the bearings at the other end of the keyboard could be similarly elongated.

The above describes several preferred embodiments of the invention and indicates a number of possible modifications that can be made. However, it will be appreciated by those skilled in the art that numerous other modifications can be made without departing from the scope of the invention as defined by the following claims.

While the invention is particularly suitable for providing thin keyboards for use with notebook computers and personal digital assistants, the features of the invention can be incorporated in any type of keyboard where it is desired to have some movement of the key when pressed and where it is desired to avoid the expense of having more complicated or expensive key structures.

Instead of having the base plate covered by a sheet 19, either attached to the base plate or to a frame, the keys can comprise separate keys mounted to the keyboard though that is a more complicated arrangement than having the keys integrally formed in a sheet of material.

The base plate need not be in the form of a printed circuit board. It could, for example, include a liquid crystal display of a portable computer. A transparent layer placed on top of the liquid crystal display can provide a membrane switch for each key. With this design, the user can touch-type directly on the liquid crystal display panel.

Instead of having a full keyboard made up of two keyboard parts, it may comprise just the one keyboard part, that is, having just one base plate.

Although the conventional QWERTY keyboard is shown in the drawings, the invention could of course be used with any type of keyboard.

What is claimed is:

1. A keyboard comprising: a substantially rigid base plate; supporting means for supporting the base plate so as to be movable between an extended position and a retracted position; biasing means biasing the base plate to the extended position; a plurality of keys arrayed over an outer surface of the base plate; and a switch means associated with each key; wherein, when any key is pressed sufficiently firmly, the supported base plate moves against the action of the biasing means substantially from the extended position to the retracted position thereby providing for at least some travel of the pressed key, and the switch means associated with the pressed key enables the registration of the pressed key, and wherein release of the pressed key allows the base plate to return to the extended position under the action of the biasing means; wherein the supporting means includes a frame supporting the base plate and the biasing means is connected between the base plate and the frame.

2. A keyboard according to claim 1, wherein each key comprises a key cap biased to a raised position spaced from the base plate and movable to a depressed position against the base plate when an outer face of the key cap is pressed sufficiently firmly, and wherein the pressing of any key sufficiently firmly to move the base plate from its extended position to its retracted position is also sufficient to move the key cap of that key from its raised position to its depressed position.

3. A keyboard according to claim 2, wherein each key is made from a resilient material and the resilience of the material biases the key cap to its raised position while allowing the key cap to be moved to its depressed position.

4. A keyboard according to claim 2, wherein the switch means associated with each key comprises an electrical circuit closing means on an inner face of the key cap and separated electrical contacts on the base plate corresponding to that key, and the electrical circuit closing means makes contact with and closes the corresponding electrical contacts on the base plate when the key cap is pressed to its depressed position.

5. A keyboard according to claim 4, wherein the base plate is selected from one of a printed circuit board, a board having conductive pattens formed on it or a flexible sheet incorporating printed conductive patterns mounted on a substantially rigid board.

6. A keyboard according to claim 1, wherein the base plate comprises a printed circuit board.

7. A keyboard according to claim 1, wherein the outer surface of the base plate is covered by a sheet of material having the plurality of keys on said sheet.

8. A keyboard according to claim 7, wherein the plurality of keys are integrally formed in the sheet.

9. A keyboard according to claim 8, wherein each key comprises a key cap biased to a raised position spaced from the base plate and movable to a depressed position against the base plate when an outer face of the key cap is pressed sufficiently firmly, and wherein the pressing of any key sufficiently firmly to move the base plate from its extended position to its retracted position is also sufficient to move the key cap of that key from its raised position to its depressed position.

10. A keyboard according to claim 9, wherein the sheet comprises a sheet of resilient material and the resilience of the material biases each key cap to its raised position while allowing the key cap to be moved to its depressed position.

11. A keyboard according to claim 9, wherein the switch means associated with each key comprises an electrical circuit closing means on an inner face of the key cap and separated electrical contacts on the base plate corresponding to that key, and the electrical circuit closing means makes contact with and closes the corresponding electrical contacts on the base plate when the key cap is pressed to its depressed position.

12. A keyboard according to claim 11, wherein the base plate comprises a printed circuit board.

13. A keyboard according to claim 7, wherein the sheet is not attached to the base plate.

14. A keyboard according to claim 13, wherein the supporting means comprises a frame extending substantially about the base plate and the sheet is attached to the frame.

15. A keyboard according to claim 7, wherein the sheet is attached to the base plate.

16. A keyboard according to claim 1, wherein there are two substantially rigid base plates arranged side-by side and each base plate is movable between its extended position and its retracted position independently of the other.

17. A keyboard according to claim 16, wherein the base plates are printed circuit boards which are interconnected by a flexible printed circuit board.

18. A keyboard according to claim 1, wherein the base plate is substantially rectangular, the frame extends about the periphery of the base plate and the biasing means comprises a biasing device at least at each corner of the base plate.

19. A keyboard according to claim 18, wherein each biasing device comprises a resilient foot on an under side of the base plate opposite that surface having the plurality of keys and the resilient feet normally support the base plate in its extended position but when a key is pressed sufficiently firmly the feet compress and the base plate is thereby moved to its retracted position.

20. A keyboard according to claim 18, wherein the outer surface of the base plate is covered by a sheet of material having the plurality of keys on said sheet and the sheet is not attached to the base plate but is attached to the frame.

21. A keyboard comprising: a substantially rigid base plate; supporting means for supporting the base plate so as to be movable between an extended position and a retracted position; biasing means biasing the base plate to the extended position; a plurality of keys arrayed over an outer surface of the base plate; and a switch means associated with each key; wherein, when any key is pressed sufficiently firmly, the supported base plate moves against the action of the biasing means substantially from the extended position to the retracted position thereby providing for at least some travel of the pressed key, and the switch means associated with the pressed key enables the registration of the pressed key, and wherein release of the pressed key allows the base plate to return to the extended position under the action of the biasing; wherein the supporting means comprises a plurality of feet attached to the base plate at a side opposite that surface having the plurality of keys, so that placement of the feet on a supporting surface supports the base plate clear of the supporting surface, and the biasing means comprises the feet being resiliently compressible so that when a key is pressed sufficiently firmly the feet compress and the base plate thereby moves from its extended position to its retracted position.

* * * * *